United States Patent
Fischer et al.

(10) Patent No.: US 10,754,451 B2
(45) Date of Patent: Aug. 25, 2020

(54) OPERATING DEVICE FOR A MOTOR VEHICLE

(71) Applicant: BEHR-HELLA THERMOCONTROL GMBH, Stuttgart (DE)

(72) Inventors: Christoph Fischer, Lippstadt (DE); Tobias Schwab, Lippstadt (DE)

(73) Assignee: BEHR-HELLA THERMOCONTROL GMBH, Stuttgart (DE)

(*) Notice: Subject to any disclaimer, the term of this patent is extended or adjusted under 35 U.S.C. 154(b) by 0 days.

(21) Appl. No.: 16/480,611

(22) PCT Filed: Jan. 12, 2018

(86) PCT No.: PCT/EP2018/050727
§ 371 (c)(1),
(2) Date: Jul. 24, 2019

(87) PCT Pub. No.: WO2018/137944
PCT Pub. Date: Aug. 2, 2018

(65) Prior Publication Data
US 2019/0391672 A1    Dec. 26, 2019

(30) Foreign Application Priority Data

Jan. 25, 2017  (DE) .................. 10 2017 101 412

(51) Int. Cl.
*G09G 5/00*    (2006.01)
*G06F 3/0362*  (2013.01)
*G06F 3/044*   (2006.01)

(52) U.S. Cl.
CPC ............ *G06F 3/0362* (2013.01); *G06F 3/044* (2013.01)

(58) Field of Classification Search
CPC ........ G06F 3/044; G06F 3/0362; G06F 3/041; G06F 21/83; G06F 2203/04108;

(Continued)

(56) References Cited

U.S. PATENT DOCUMENTS 7,145,087 B1 * 12/2006 Su .................... H01H 19/11
                                                  200/4
7,414,205 B1 *  8/2008 Heinrich ............ H01H 19/63
                                                  200/336

(Continued)

FOREIGN PATENT DOCUMENTS

| DE | 197 43 283 C5    | 5/2004  |
|----|------------------|---------|
| DE | 10 2006 043 208 A1 | 3/2008  |
| DE | 10 2010 010 574 A1 | 9/2011  |
| DE | 10 2011 007 112 A1 | 10/2012 |
| DE | 20 2012 007 093 U1 | 8/2013  |
| DE | 10 2014 113 877 A1 | 3/2016  |

(Continued)

OTHER PUBLICATIONS

International Search Report dated Feb. 28, 2018 in International Application No. PCT/EP2018/050727 dated Feb. 28, 2018, with English translation.

Primary Examiner — Duc Q Dinh
(74) Attorney, Agent, or Firm — Morgan, Lewis & Bockius LLP

(57) ABSTRACT

The operating device for a vehicle comprises a capacitively operating touch panel having an upper face with a touch sensitive surface, and an operating unit having a movable operating element which can be grasped manually and has an electrically conductive surface and a plate shaped holding element, provided with an upper face and a lower face facing away from the upper face, on which the operating element is movably arranged and which for its part is arranged on the touch-sensitive surface of the upper face of the touch panel. The operating element comprises at least one wiper, electrically connected to the electrically conductive surface of the operating element, sliding along a sensing path of the upper face of the holding element when the operating element is moved. The holding element comprises alternately successively arranged first sections and second sections along the sensing path. The upper and lower face of the holding element are connected to each other in an electri- (Continued)

Figure 1:
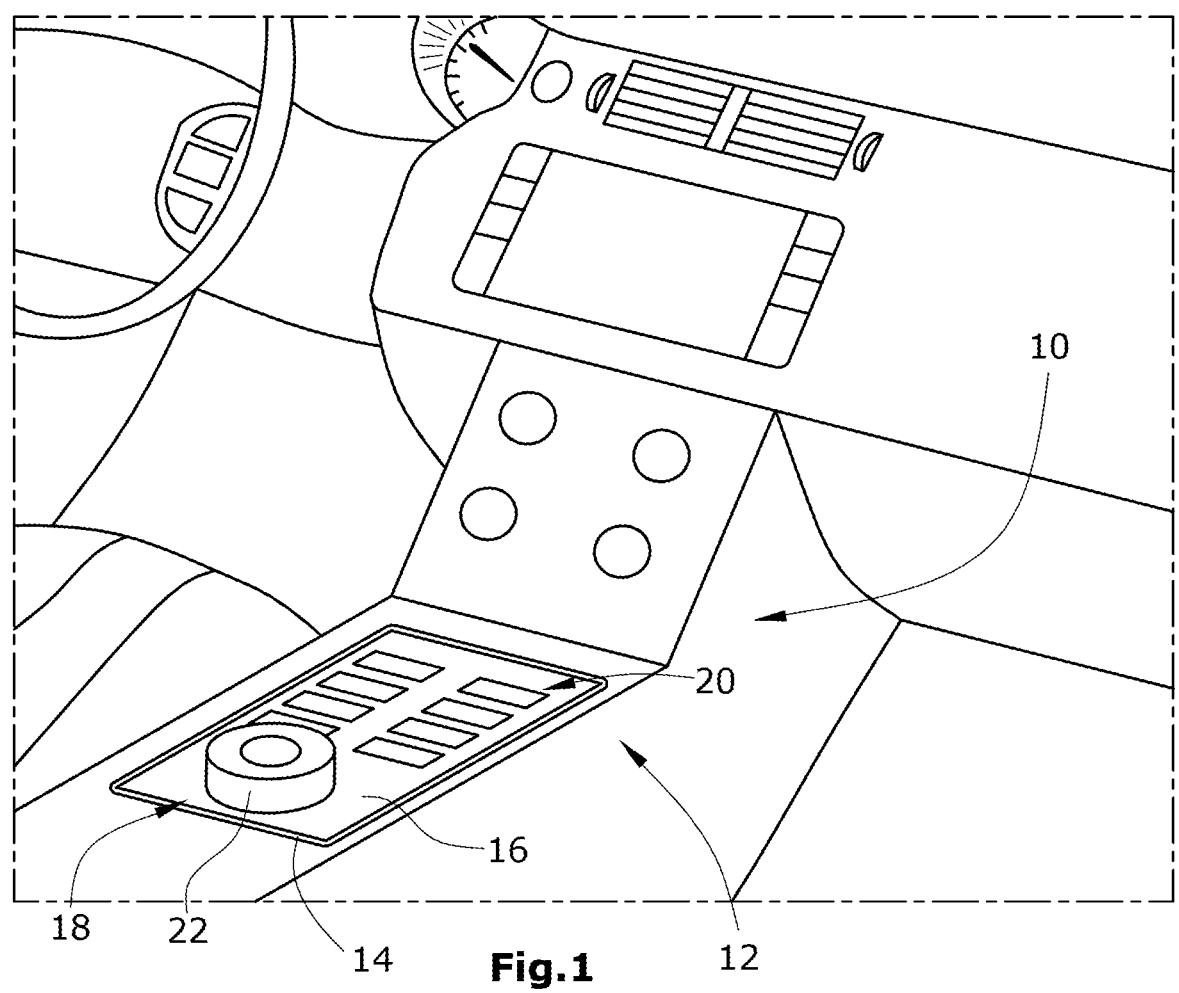

cally conductive manner in each of the first sections and are electrically insulated from each other in each of the second sections.

18 Claims, 10 Drawing Sheets

(58) Field of Classification Search
CPC ............... G06F 3/0236; G06F 3/03547; G06F 3/04842; G06F 3/0393; G06F 2203/04103; G06F 3/0446; B60Y 2200/11; B60Y 2200/12; B60Y 2200/126; B60Y 2200/13; B60Y 2200/30; B60Y 2200/40; B60Y 2200/50; B60Y 2200/90
USPC .... 345/173–175, 184, 156; 200/4, 5 A, 11 R
See application file for complete search history.

(56) References Cited

U.S. PATENT DOCUMENTS

| | | | |
|---|---|---|---|
| 9,296,140 B2* | 3/2016 | Harris | B60K 37/06 |
| 9,692,261 B2* | 6/2017 | Nemoto | H02K 21/14 |
| 9,922,784 B2* | 3/2018 | Levay | B60H 1/0065 |
| 2008/0185272 A1* | 8/2008 | Otani | B60K 37/06 200/318 |
| 2011/0061489 A1* | 3/2011 | Bulin | G05G 1/12 74/553 |
| 2014/0042004 A1 | 2/2014 | Tseng | |
| 2017/0052617 A1* | 2/2017 | Okuzumi | B60R 16/02 |

FOREIGN PATENT DOCUMENTS

| | | |
|---|---|---|
| DE | 10 2014 218 493 A1 | 3/2016 |
| EP | 2 302 799 A2 | 3/2011 |

* cited by examiner

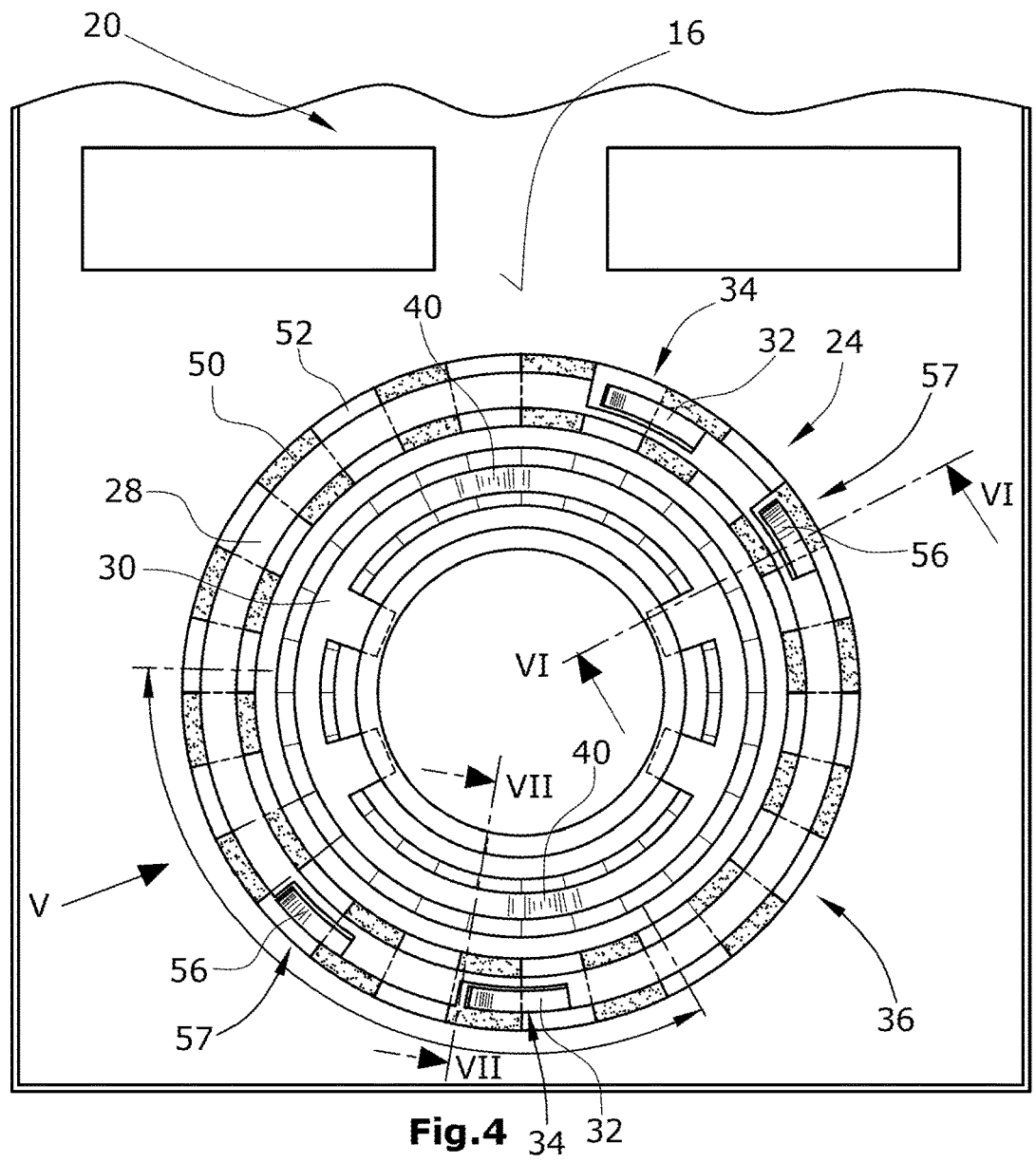
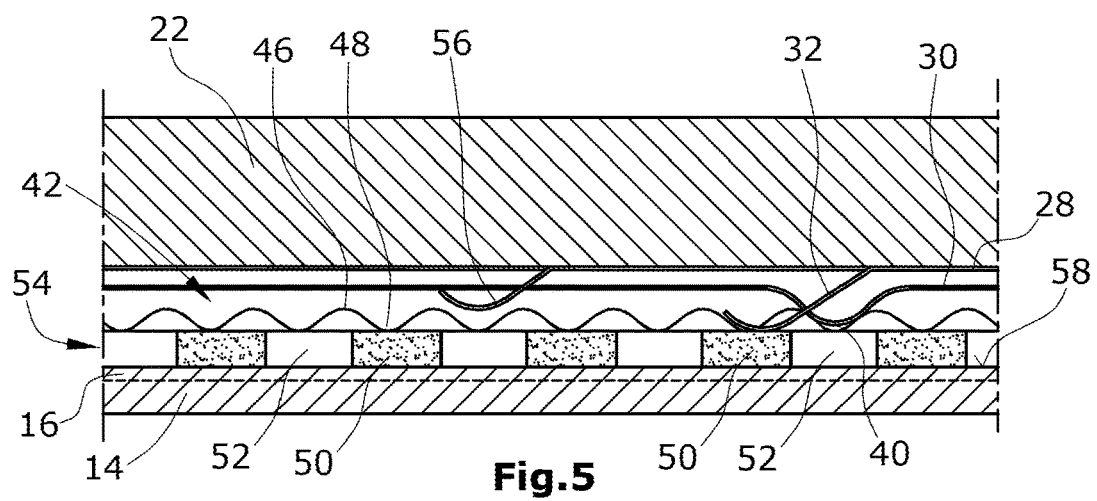

OPERATING DEVICE FOR A MOTOR VEHICLE

CROSS REFERENCE

This application is the U.S. National Phase under 35 U.S.C. § 371 of International Application No. PCT/EP2018/050727 filed on Jan. 12, 2018, which claims the benefit of German Application No. 10 2017 101 412.8 filed on Jan. 25, 2017, the entire contents of each are hereby incorporated by reference.

The invention relates to an operating device for a motor vehicle comprising a touch panel, having an upper face with a touch-sensitive surface, on which an operating unit is arranged having a translatory or rotatably movable operating element which can be grasped manually.

Touch panels and particularly touch screens have become more and more established as operating devices for vehicles in recent years. However, it is occasionally more comfortable to enter operating commands by means of operating elements which can be grasped manually, which are rotatably movable (as rotary adjusters) or translatory movable (as sliders), and which are optionally provided with push functions.

It has already been described in different ways how to combine manually operable operating elements with touch panels or touch screens. Examples are described in DE-C-197 43 283, DE-A-10 2006 043 208, DE-A-10 2010 010 574, DE-A-10 2011 007 112 and EP-A-2 302 799. In the known operating devices, an encoder element coupled with the operating element moves on the touch-sensitive surface of the touch panel in order to use its touch sensor system for determining the current movement position of the operating element. It is sometimes desirable that the user can position the operating element at different positions of the touch panel. Encoder elements moving on the surface of the touch panel may cause damage and wear to the touch-sensitive surface of the touch panel (scratches, abrasive marks, etc.), which should be avoided.

A decoder for generating binary coded signals when adjusting an adjusting button is, for example, known from DE-U-20 2012 007 093. A rotary selection and operating device is known from DE-A-10 2014 113 877.

An object of the invention is to provide an operating device with a touch panel and a manually operable operating element without affecting the surface of the touch panel.

According to the invention, this object is achieved by an operating device for a vehicle, comprising:
- a capacitively operating touch panel having an upper face with a touch-sensitive surface, and
- an operating unit having a translatory or rotatably movable operating element which can be grasped manually and has an electrically conductive surface, and having a plate-shaped holding element, provided with an upper face and a lower face facing away from the upper face, on which the operating element is movably arranged and which for its part is arranged on the touch-sensitive surface of the upper face of the touch panel,
wherein the operating element comprises at least one motion detection encoder element electrically connected to the electrically conductive surface of the operating element, and which is preferably a wiper sliding along a sensing path of the upper face of the holding element when the operating element is moved,
wherein the holding element comprises a plurality of first sections and a plurality of second sections along the sensing path which are arranged alternately successively, and
wherein the upper and lower face of the holding element are connected to each other in an electrically conductive manner in each of the first sections and are electrically insulated from each other in each of the second sections.

According to the invention, it is provided that a plate-shaped holding element is arranged on the touch-sensitive surface of the touch panel, wherein at least one motion detection encoder element, for example in the form of a wiper, is mounted on the upper side of the holding element and is moved along with the movement of the operating element. The wiper (in the following, without limiting the generality of the possible embodiments of the at least one motion detection encoder element, it is predominantly referred to its embodiment as a wiper) slides along a sensing path on the upper face of the holding element. If the operating element is adapted as a rotary adjuster, the sensing path is a circular path. According to the invention, the nature of the material of the holding element along its sensing path is such that the sensing path alternately comprises first and second sections. In the first sections, the upper face of the holding element is electrically connected to the lower face of the holding element, while the holding element is electrically insulated in the area of the second sections. For example, the plate-shaped holding element is made of plastic, wherein the first sections of the sensing path are realized by electrically conductive material blocks. For example, an electrically conductive material, such as carbon black, could be added to the plastic material of the holding element in the area of the first sections. Preferably, the holding element is a two-component holding element.

The first sections form individual surface areas along the sensing path which are separated from each other by the second sections and which are aligned, for example, with correspondingly large, i.e. equally large, surface areas on the lower face of the holding element. The at least one wiper is electrically connected to the electrically conductive surface of the operating element. Thus, the at least one wiper has the operator's electrical potential or electrical charge when the operating element is touched (or in other words, the wiper acts as ground). If, when the operating element moves, the wiper slides along the sensing path until the operating element remains in a movement position in which the at least one wiper rests on a first section of the sensing path, then movement position of the operating element can be detected by transmitting the electrical charge from the upper face of the holding element via the first section to the lower face of the holding element and from there to the surface of the touch panel whose sensor system is used for detecting. Preferably, the operating element comprises at least two wipers which are correspondingly arranged offset from one another, so that, in each movement position of the operating element, exactly one of the wipers rests on an electrically conductive first section of the sensing path. For example, if the sensor system of the touch panel does not detect any change in the wiper positions, it can be determined by means of a corresponding software control that the operating element has been transferred to a movement position in order to read out this movement position.

According to the invention, a plurality of first sections and a plurality of second sections are arranged alternately successively along the sensing path and form the sensing path.

The advantage of the operating device according to the invention is, inter alia, that the one or more wipers do no longer slide on the touch-sensitive surface of the touch panel and thus can no longer mechanically affect this surface. This is particularly advantageous for all applications in which the operating element can be positioned at different positions on the touch-sensitive surface of the touch panel. In such an application, the operating element can be moved together with the holding element, for example, on the touch-sensitive surface. The holding element can, for example, be positioned and fixed magnetically on the surface of the touch panel. It is also possible to use reversibly detachable adhesive bonds as a mount for the holding element on the touch panel. Finally, pneumatic systems, such as suction cups or the like, are also considered to be appropriate.

As already described above, the operating element can be adapted as a rotary adjuster or a slider. Thus, the operating element is mounted on the holding element either rotatably movable or translatory movable. In the first case, the holding element may comprise a collar protruding upwards whose axis forms the rotation axis of the rotary adjuster. In case of a translatory movable arrangement of operating elements and holding elements, the holding element may comprise a bar protruding upwards on which the operating element, i.e. the slider, is slidably guided. Other guiding systems can also be realized, particularly systems which do not necessarily slidably guide the slider on a linear path but, for example, on a curved path. According to the invention, the term "translatory" does not necessarily relate to a linear movement but also to a movement along a curve, or a movement composed of curves and linear sections.

In an advantageous embodiment of the invention, it can be provided, as already mentioned above, that the operating element comprises two wipers arranged offset to each other along the sensing path, wherein the offset between the two wipers extends along a length corresponding to the extension of successive first and second sections with either an even number of first sections and an uneven number of second sections, or an uneven number of first sections and an even number of second sections, wherein, in each movement position of the operating element, one of the two wipers contacts a first section of the sensing path. By arranging two motion detection encoder elements, it is not only possible to detect a movement of the operating element, but also its movement direction.

In addition to the at least one motion detection encoder element provided according to the invention, the operating element may comprise, in a further advantageous embodiment of the invention, a push detection encoder element which only contacts one (of a plurality of) local areas electrically connecting the upper face of the holding element with its lower face if the operating element is in a pushed down state. Thus, the operating element can be pushed down reversibly in the direction of the holding element and preferably moves back automatically into the opposite direction if no pressure is exerted on the operating element. The local areas are, for example in addition to the first sections of the holding element, formed/arranged thereon and/or therein.

In the aforementioned embodiment of the invention, it is particularly expedient if the respective electrical area of the holding element, contacted in a pushed down state of the operating element by the at least one push detection encoder element, is one of the first sections of the holding element.

As already described above with regard to the wipers, it may be expedient if the operating element comprises two push detection encoder elements arranged offset to each other along the sensing path, wherein, in each movement position of the operating element, at least one of the push detection encoder elements contacts a first section of the sensing path. It may be advantageous in such a double arrangement of push detection encoder elements if the offset between the two push detection encoder elements extends along a length corresponding to the extension of successive first and second sections with either an even number of first sections and an uneven number of second sections, or with an uneven number of first sections and an even number of second sections.

In a further expedient embodiment of the invention, it may be advantageous that the at least one wiper is a deformation or an element being an integral component of a linear or circular, electrically conductive spring material strip and protruding or projecting therefrom. On this spring material strip, or on an additionally provided spring material strip, the at least one push detection encoder element can also be adapted as a deformation or as an element.

To increase the operating comfort of manually movable operating elements, it is expedient if the operating element comprises a detent means with at least one elastically or reversibly movable detent element, and a detent path with alternately successively arranged detent protrusions and detent recesses, wherein the at least one detent element is arranged on the operating element and the detent path on the holding element or vice versa.

The detent path may, for example, be adapted as an arrangement of detent protrusions and detent recesses spatially separated from the sensing path. The reversibly movable detent element, which may also be arranged in a second embodiment as sliding over the detent path, is, for example, provided on a spring material strip or adapted as a detent ball or the like. The operating element is now always in a stable rest position if the detent element is located in a detent recess. In these rest positions, the wiper always contacts an electrically conductive first section of the sensing path of the holding element. If two wipers are provided, exactly one wiper contacts a first section of the holding element in each rest position of the operating element defined by the detent recesses.

With regard to a compact arrangement and reduced assembly costs, it is expedient if the sensing path of the holding element is adapted as a detent path of the detent means and comprises detent protrusions and detent recesses. Thus, the sensing path takes over the function of the detent path in this embodiment of the invention. The wiper or the two wipers serve as detent elements. In each detent recess, the at least one wiper therefore contacts exactly one electrically conductive first section of the sensing path. If the operating element comprises a push function, the push detection encoder element contacts an electrically conductive area of the holding element which is expediently a first section of the sensing path adapted as a detent path. If the operating element is not pushed, then the at least one rotary detection encoder element is located at a distance above the detent and sensing path.

In a further advantageous embodiment of the invention, it may be provided that first and second sections of the holding element, arranged along the sensing path, extend from the center of a detent recess to the center of an adjacent detent recess, or from the center of a detent protrusion to the center of an adjacent detent protrusion.

Depending on the design requirements, it may be required that the operating unit is only partially arranged on the touch-sensitive surface of the upper face of the touch panel or the touch screen. Thus, an overlap area is formed within which the holding element is located on the touch panel or the touch screen. To ensure the aforementioned sensing of a (rotary or translatory) movement of the operating element and/or a push movement of the operating element, it is required that, in each movement position of the operating element, at least one of the motion detection encoder elements is positioned, and that, if provided, at least one of the push detection encoder elements is positioned in the area of the upper face of the holding element below which the touch-sensitive surface of the upper face of the touch panel is located. If, in addition to the pure movement, the movement direction shall also be sensed, it is further expedient if two motion detection encoder elements are positioned in each movement position of the operating element, and, if provided, at least one of the push detection encoder elements is positioned in the area of the upper face of the holding element below which the touch-sensitive surface of the upper face of the touch panel is located.

Figure 2:
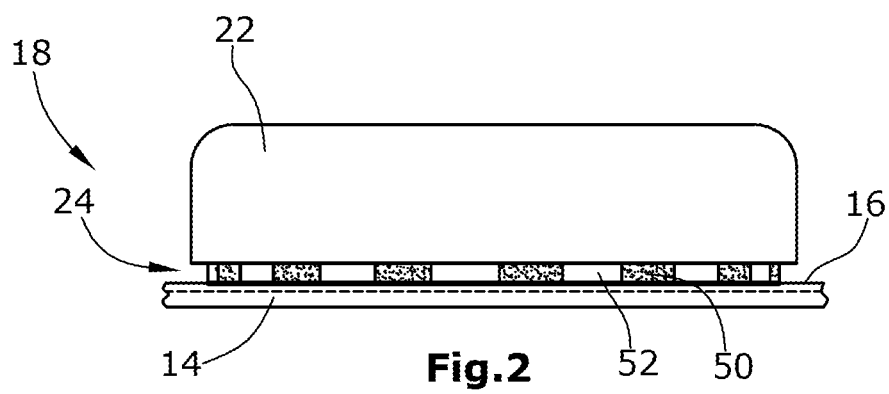
Figure 3:
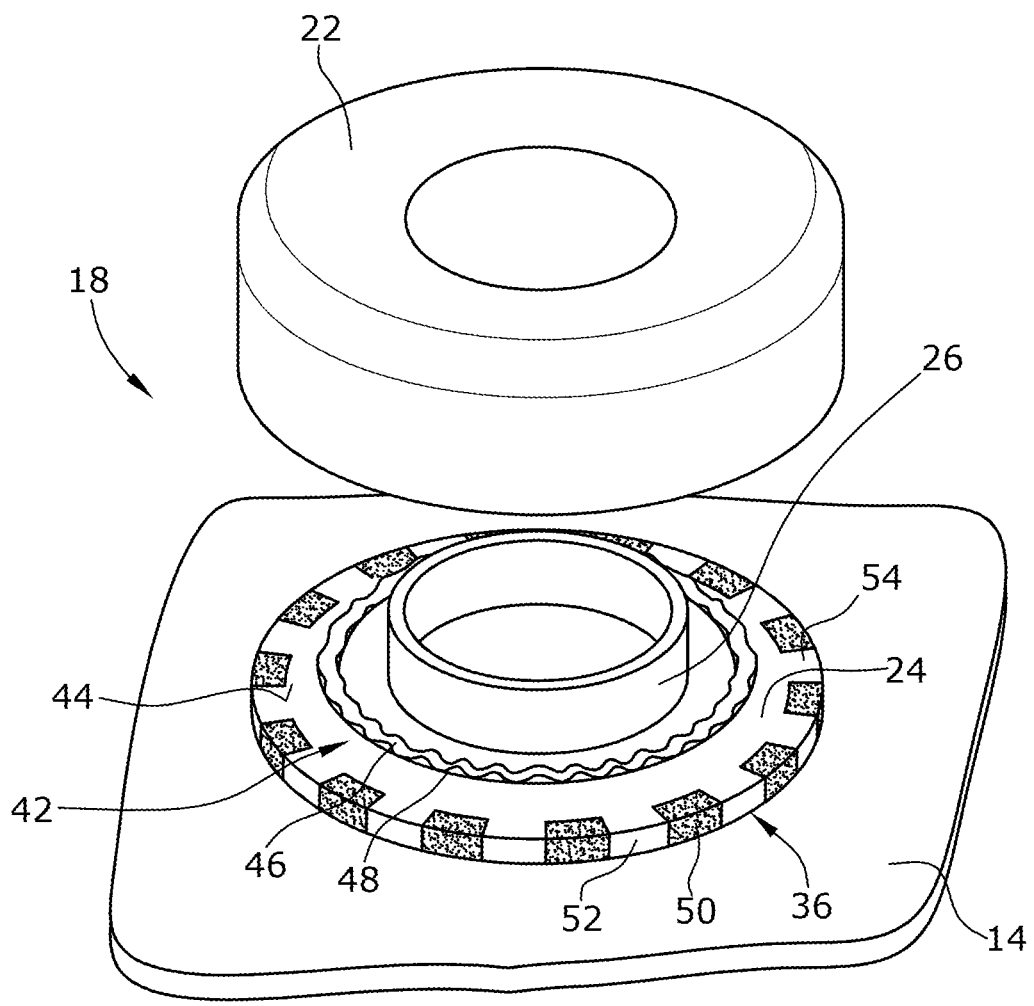
Figure 6:
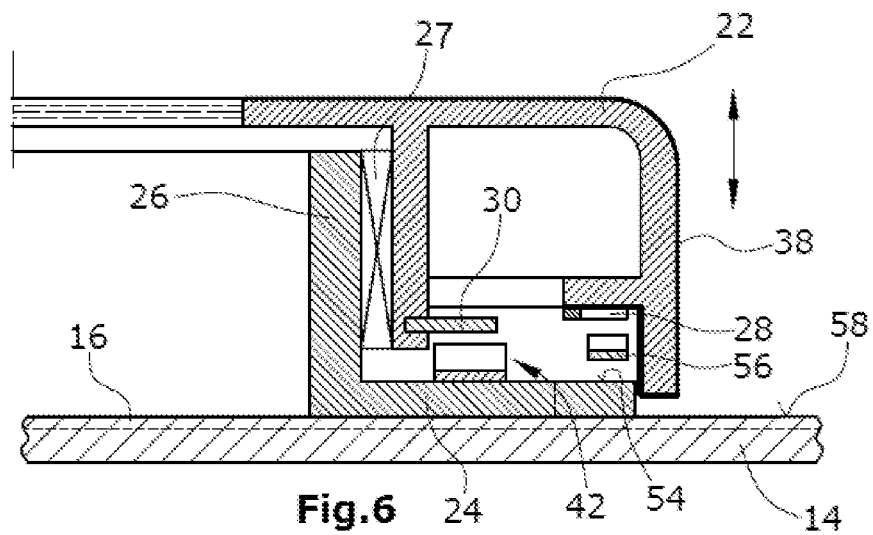
Figure 7:
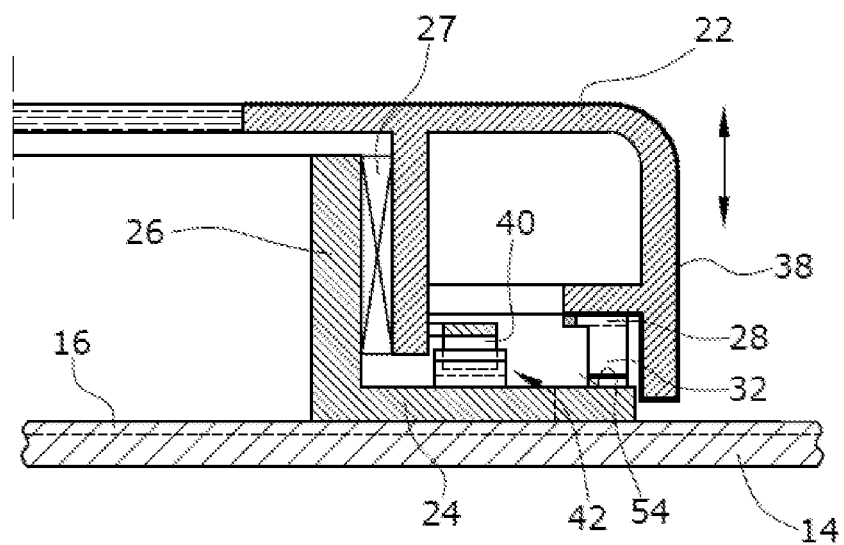
Figure 8:
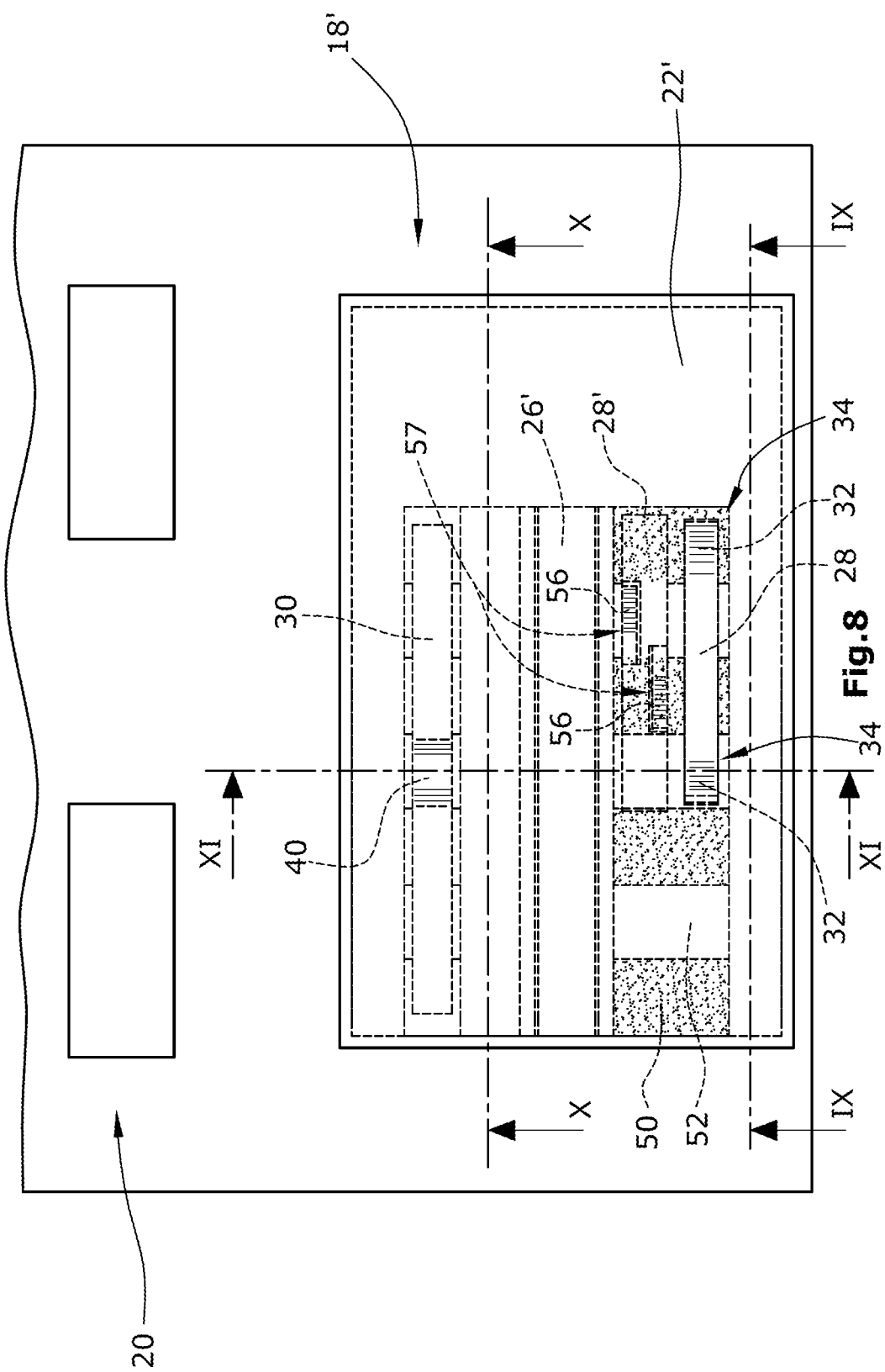
Figure 9:
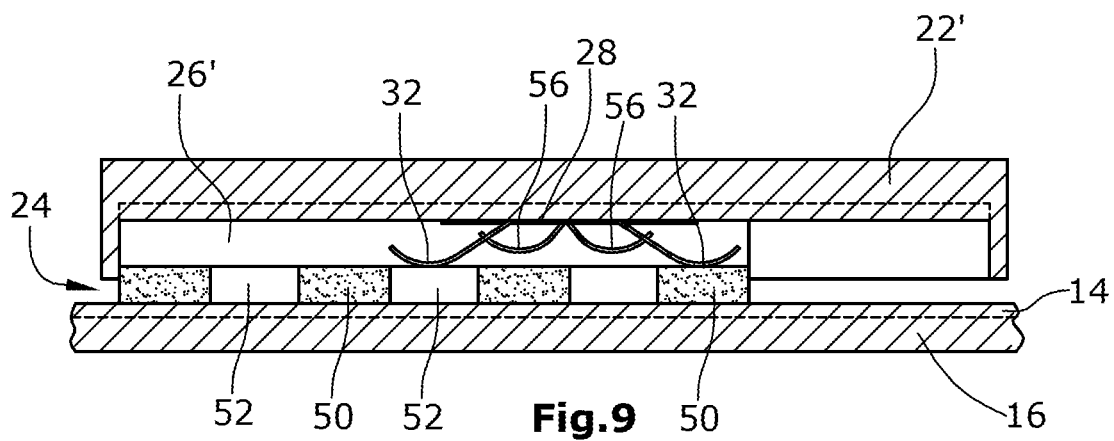
Figure 10:
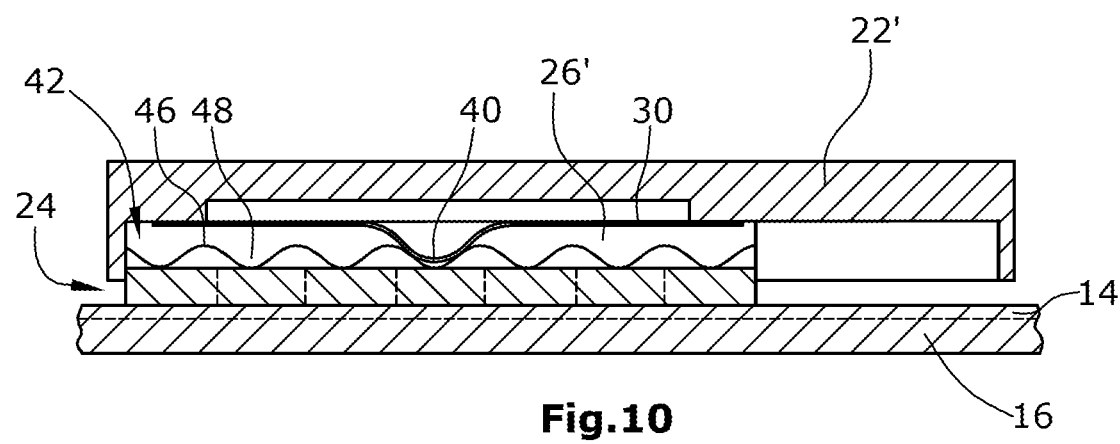
Figure 11:
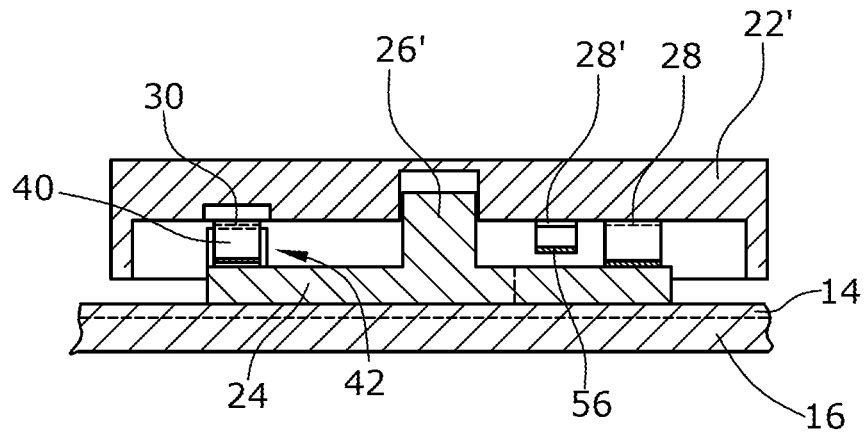
Figure 12:
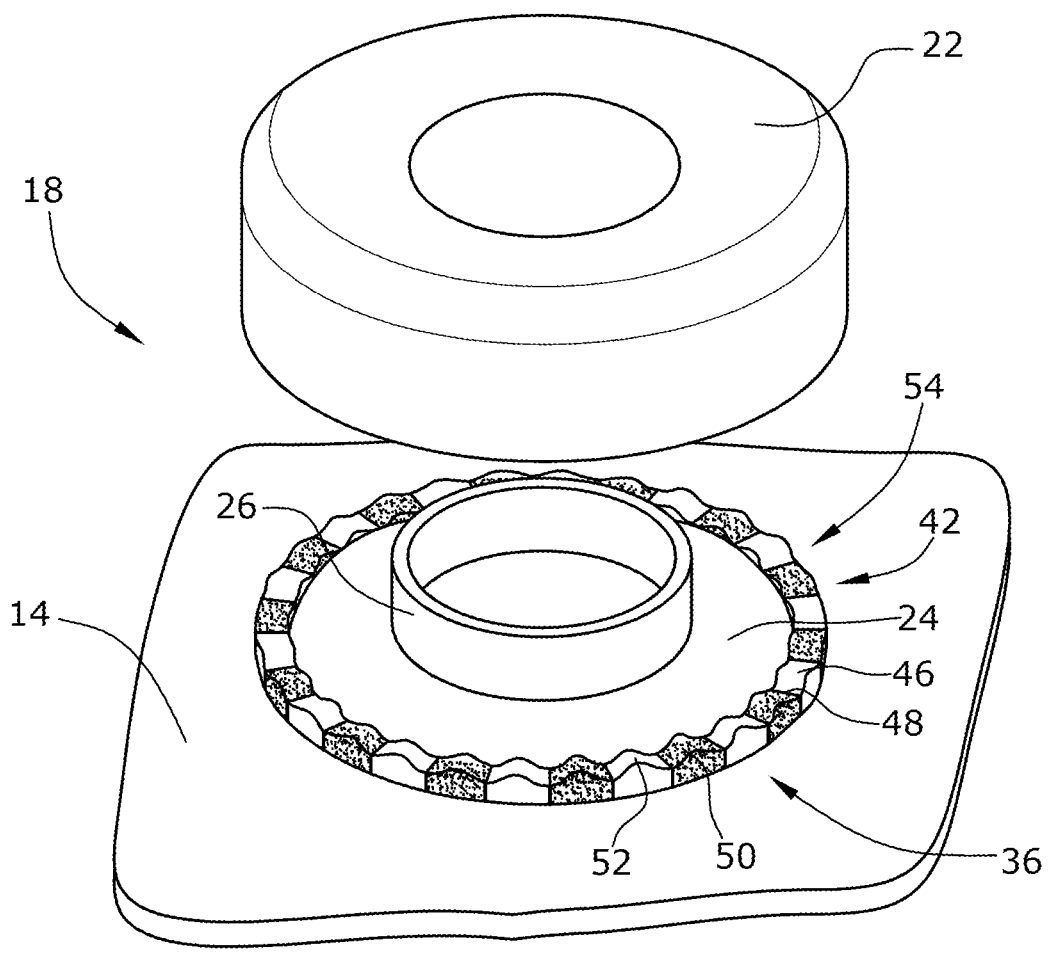
Figure 13:
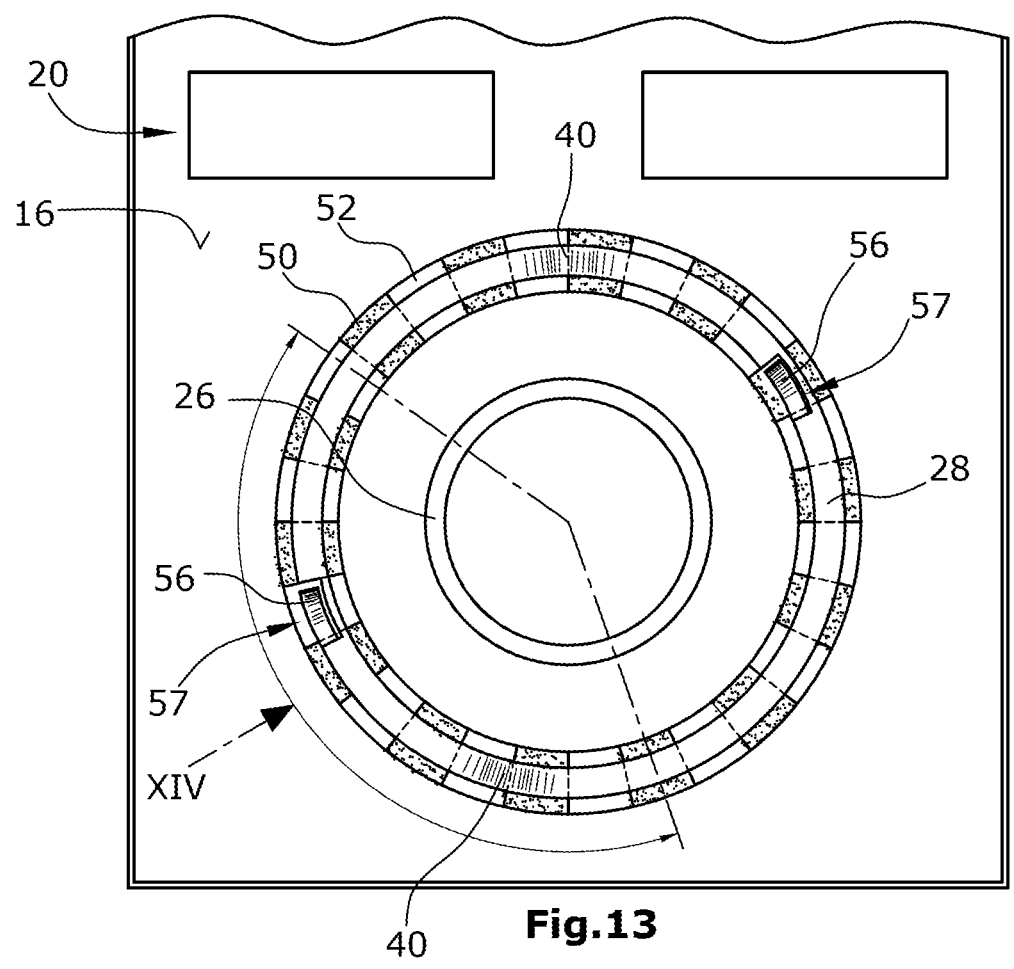

In the following, various embodiments of the invention are explained in detail by means of the drawings. The individual figures show the following:

FIG. 1 view on a vehicle's center console having a touch screen and a rotary adjuster operating unit arranged thereon, FIG. 2 side view of the rotary adjuster operating unit, FIG. 3 perspective view of the rotary adjuster operating unit, according to a first exemplary embodiment, with the rotary operating element being removed, FIG. 4 top view on the holding element of the rotary adjuster operating unit arranged on the touch screen according to FIG. 3, FIG. 5 side view on the circumferential area, indicated by the double arrow in FIG. 4, as an unfolding, FIGS. 6 and 7 cross-sections through the holding element, including the rotary operating element, along the lines VI-VI and VII-VII of FIG. 4, FIG. 8 top view on a touch screen with a sliding operating unit arranged thereon according a second exemplary embodiment, FIGS. 9 to 11 sectional view along the lines IX-IX, X-X and XI-XI of FIG. 8, FIG. 12 perspective view of a third exemplary embodiment of a rotary adjuster operating unit, FIG. 13 top view on the holding element of the operating unit according to FIG. 12

Figure 14:
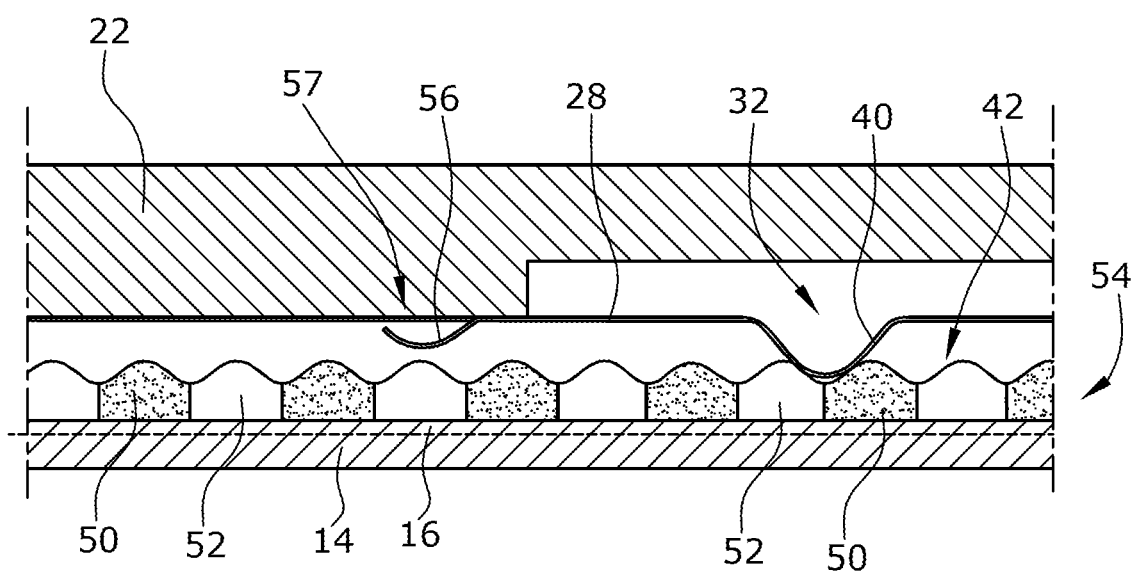
Figure 15:
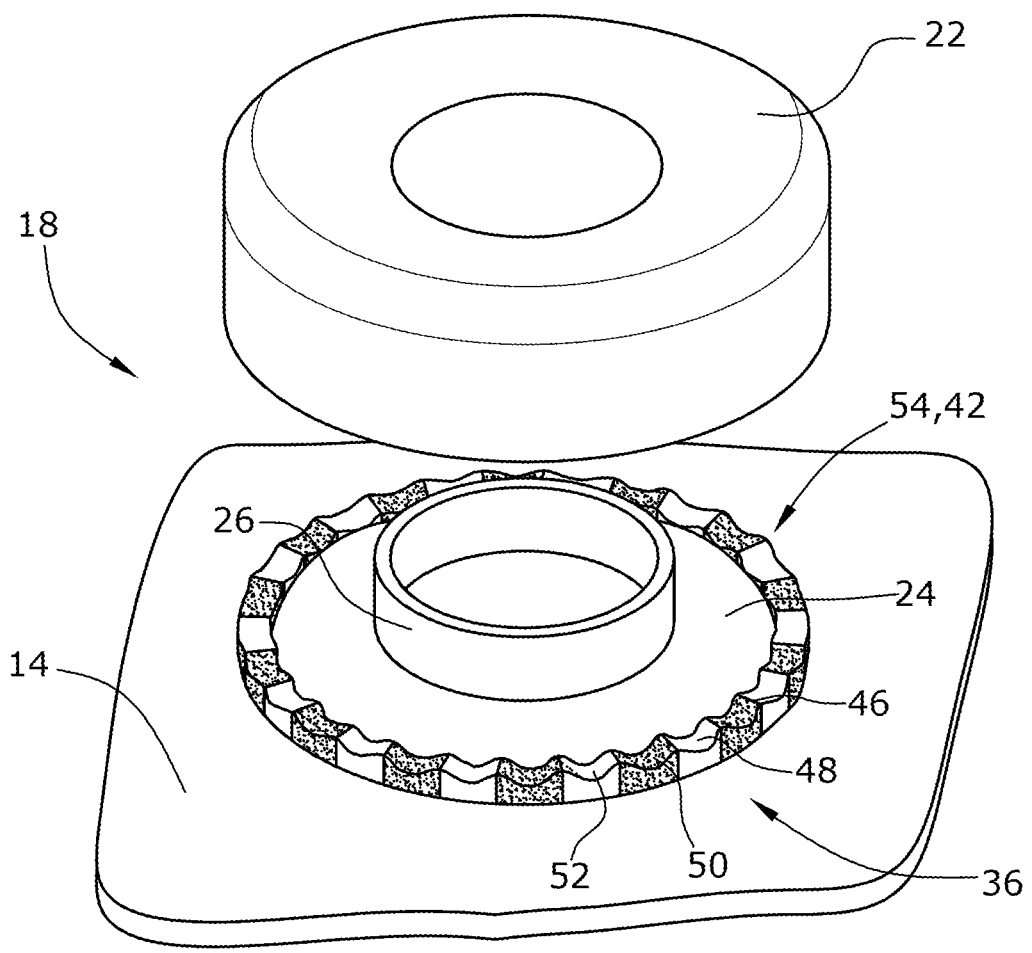
Figure 16:
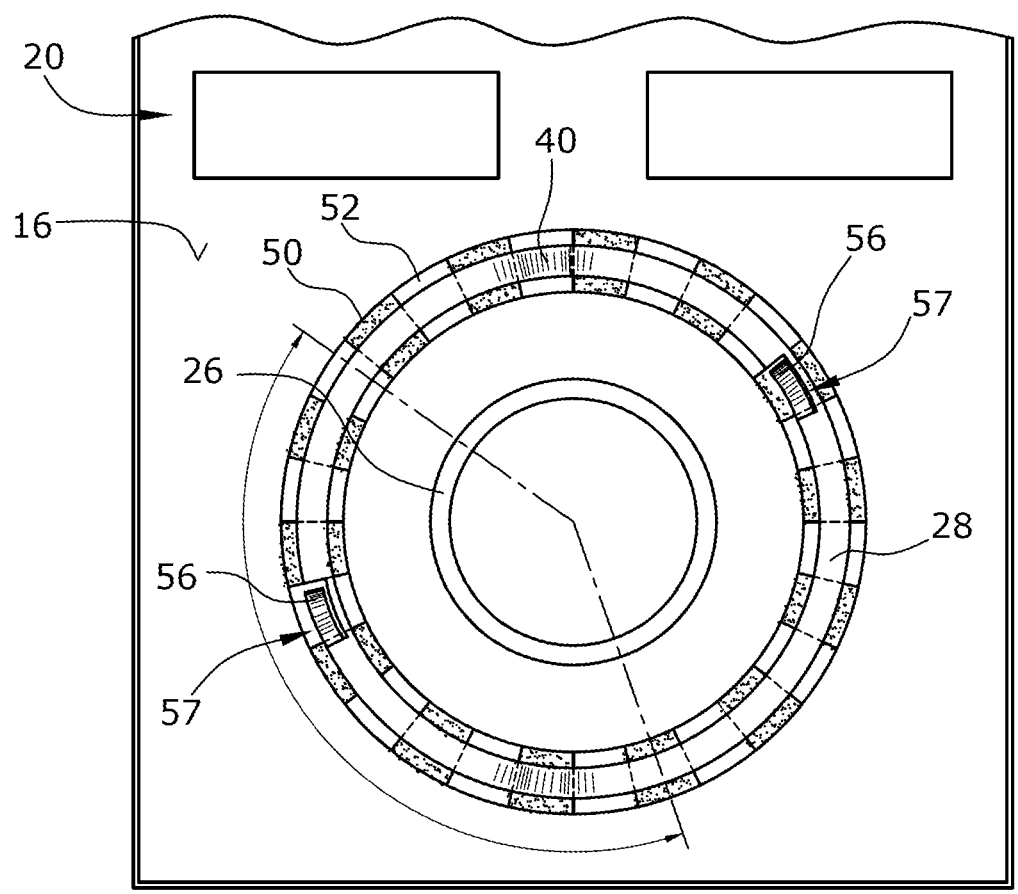
Figure 17:
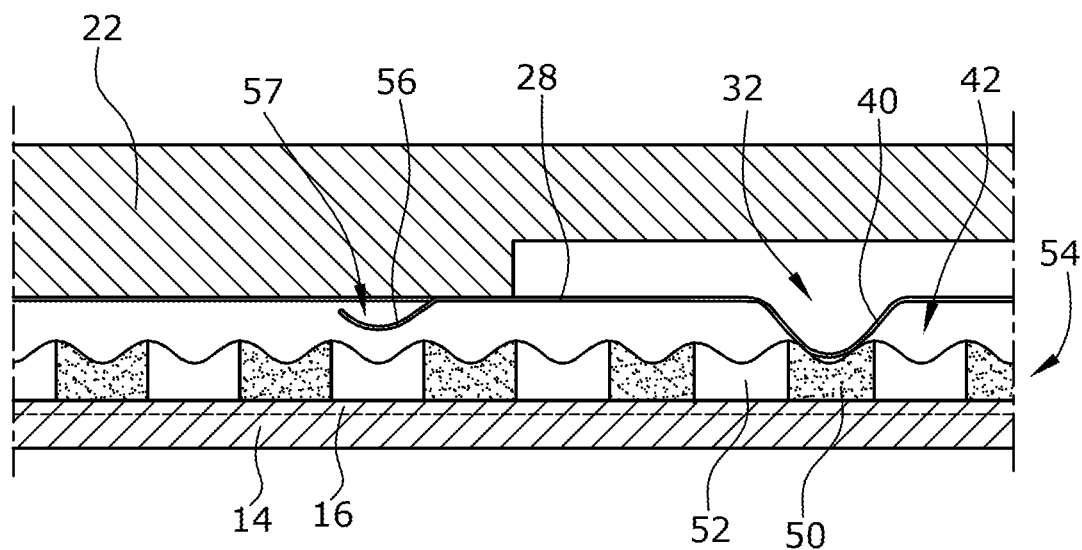

FIG. 14 side view on the circumferential area, indicated by the double arrow in FIG. 4, as an unfolding, FIG. 15 perspective view of a fourth exemplary embodiment of an operating element, FIG. 16 top view on the holding element of the operating unit according to FIG. 15, and FIG. 17 side view on the circumferential area, indicated by the double arrow in FIG. 16, as an unfolding.

FIG. 1 shows a perspective view of the area around the center console 10 of a vehicle. The center console 10 is provided with an operating unit 12 which comprises a touch screen 14 having a touch panel 16 and an operating unit 18 arranged on the touch screen 14. The reference number 20 indicates various touch fields displayed on the touch screen 14.

In this exemplary embodiment, the operating unit is adapted as a rotary adjuster 22.

A first exemplary embodiment of the rotary operating unit 18 is explained in the following with reference to FIGS. 2 to 7.

According to FIGS. 2 and 3, the operating unit 18 comprises a plate-shaped holding element 24 made of a dielectric material, for example plastic, and is adapted in this exemplary embodiment in the form of a disc with a collar 26 protruding upwards. A rotary and push bearing 27 is located between the collar 26 and the rotary adjuster 22 (see FIGS. 6 and 7). On the lower face of the rotary adjuster 22, two circular spring material strips 28, 30 are located of which the outer spring material strip 28 comprises two wipers 32 as rotary or motion detection encoder elements 34 which slide along the outer edge area 36 of the holding element 24 if the rotary adjuster 22 is manually rotated. The rotary adjuster 22 is provided with an electrically conductive material layer 38 extending partially to the lower face of the rotary adjuster 22 (see FIGS. 6 and 7). The outer spring material strip 28 is electrically connected with this electrically conductive material layer 38.

The inner spring material strip 30 comprises two detent projections 40 sliding along a detent path 42 on the upper face 44 of the holding element 24. The detent path 42 is provided with detent protrusions 46 and detent recesses 48. By providing the inner spring material strip 30 with detent projections 40, the inner spring material strip 30 acts like a detent spring for the mechanical haptics of the rotary adjuster 22 during rotation. Thus, the rotary adjuster 22 assumes defined rest positions.

In order to now determine the rotation position of the rotary adjuster 22 in the various rest positions by means of the touch panel 16, the holding element 24 comprises, in its outer edge area 36, electrically conductive first sections 50 and electrically insulating second sections 52 in alternation. The succession of these first and second sections 50, 52 forms a sensing path 54 along which the two wipers 32 slide. The offset of the two wipers 32 in circumferential direction is such that, in each rest position of the rotary adjuster 22 defined by a detent recess 48, one of the two wipers 32 rests on an electrically conductive first section 50 (see e.g. FIG. 5).

As can be recognized in FIGS. 6 and 7, the rotary adjuster 22 can be pushed down. In a pushed down state, the sensing path 54 is preferably contacted at two points by two tongues 56 of the outer spring material strip 28 which serve as push detection encoder elements 57. As can be recognized in FIG. 5, these tongues 56 are located, if the rotary adjuster 22 is not pushed down, above the sensing path 54 and only contact the sensing path 54 if the rotary adjuster 22 is pushed down. Then, one of the two tongues 56 rests on an electrically conductive first section (provided that the rotary adjuster 22 assumes a rest position defined by the detent recesses 48).

When grasping the rotary adjuster 22, the wipers 32 and the tongues 56 assume the electrical potential or charge of the hand. Exactly one of the two wipers 32 always contacts one of the electrically conductive sections 50, whereby, via this section, the electrical charge or the electrical potential of the outer spring material strip 28 is transferred on the upper face 58 of the touch panel 16. The capacitive sensor system (not illustrated) of the touch panel 16 then determines the position at which the wiper 32 is located, whereby the rotation position of the rotary adjuster 22 can be detected. In the same way, the push function of the rotary adjuster 22 can be detected; in this case one of the two tongues 56 rests on one of the electrically conductive first sections 50.

FIGS. 8 to 11 show an exemplary embodiment of the invention in which the operating unit is adapted as a sliding operating unit 18'. If the elements of this sliding operating unit 18' correspond to those of the rotary operating unit 18 in FIGS. 1 to 7, they have the same reference numerals in FIGS. 8 to 11 as in FIGS. 1 to 7.

For the sliding operating unit 18', the operating element is adapted as a sliding button 22'. The collar 26 of the holding element 24 according to FIGS. 2 to 7 is replaced by the bar 26' protruding upwards from the, in this case, rectangular, plate-shaped holding element 24. The configuration of the first and the second sections of the sensing path as well as the configuration of the detent means of the sliding operating unit 18' is selected as described above with reference to FIGS. 2 to 7.

Unlike the configuration and arrangement of the wipers 32 and tongues 56 in the exemplary embodiment according to FIGS. 2 and 7, these components are distributed in the exemplary embodiment according to FIGS. 8 to 11 on two spring material strips 28, 28'. The spring material strip 28' comprises tongues 56 as push detection encoder elements 57, while the spring material strip 28 comprises wipers 32 as rotary detection encoder elements 34.

In FIGS. 12 to 17, two further exemplary embodiments of a rotary adjuster operating unit on a touch panel are illustrated, whose special feature, compared to the exemplary embodiments of FIGS. 1 to 12, is, inter alia, that the sensing path 54 also assumes the function of the detent path 42, which can be advantageous with regard to reducing the required assembly space. With regard to FIGS. 12 to 17, it also applies that the components of the operating units of these two exemplary embodiments corresponding to those of the exemplary embodiment according to FIGS. 1 to 7 are provided with the same reference numerals.

The aforementioned special feature is, for example, shown in FIG. 12. The holding element 24 comprises on its outer edge area 36 the sensing path 54 which is in turn composed of the electrically conductive first sections 50 and the electrically insulating second sections 52, wherein both section types alternately succeed one another. The two aforementioned sections form on their upper face a wavelike detent path 42 having detent protrusions 46 and detent recesses 48. On the lower face of the rotary adjuster 22, a single spring material strip is located in which a detent projection 40 is formed which also assumes the function of the wiper 32 as a rotary or motion detection encoder element 34. In addition, the spring material strip 28 comprises the tongues 56 as push detection encoder elements 57.

In each rest position of the rotary adjuster 22 defined by the detent path 42, the detent projection 40 contacts an electrically conductive first section 50 of the sensing path 54. Due to reasons of symmetry, it may be advantageous to provide two detent projections 40. The rotation position of the rotary adjuster 22 can be determined by means of software. For this purpose, it is advantageous if the two detent protrusions 40 are not exactly diametrically facing each other (see FIG. 13).

If the rotary adjuster 22 is pushed, the two push detection encoder elements 57 also contact the detent path 42 or the sensing path 54, wherein exactly one of the two push detection encoder elements contacts an electrically conductive first section 50.

FIGS. 15 to 17 show a further exemplary embodiment of a rotary operating unit 18. Unlike the configuration of this unit according to FIGS. 12 to 14, the division of the sensing path 54 and the detent path 42 into the electrically conductive first sections 50 and the electrically insulating second sections 52 is selected differently. In this exemplary embodiment, always only one of the two detent projections 40 contacts a first section 50 in each rest position of the rotary adjuster 22 defined by the detent recesses 48 of the detent path 42, whereby the rotation position of the rotary adjuster 22 is clearly detectable. The push detection encoder elements 57 immerse into the detent recesses or into one of the detent recesses 48, wherein one of the two push detection encoder elements 57 immerses into respectively one detent recess 48 (first section 50) of the sensing path 54, and thus the push function is detectable.

LIST OF REFERENCE NUMERALS 10 center console
12 operating unit
14 touch screen
16 touch panel
18 rotary operating unit
18' sliding operating unit
20 touch fields
22 rotary adjuster
22' sliding button
24 holding element
26 collar of holding element
26' bar of holding element
27 rotary and push bearing
28 spring material strip
28' spring material strip
30 spring material strip
32 wiper
34 rotary or motion detection encoder element
36 outer edge area of holding element
38 material layer
40 detent projections
42 detent path
44 upper face of holding element
46 detent protrusions
48 detent recesses
50 first sections of sensing path
52 second sections of sensing path
54 sensing path
56 tongues
57 push detection encoder element
58 upper face of touch panel

The invention claimed is:

1. An operating device for a vehicle, comprising
a capacitively operating touch panel having an upper face with a touch sensitive surface, and
an operating unit having a translatory or rotatably movable operating element which can be grasped manually and has an electrically conductive surface, and having a plate shaped holding element, provided with an upper face and a lower face facing away from the upper face, on which the operating element is movably arranged and which for its part is arranged on the touch-sensitive surface of the upper face of the touch panel,
wherein the operating element comprises at least one motion detection encoder element electrically connected to the electrically conductive surface of the operating element, and which is preferably a wiper sliding along a sensing path of the upper face of the holding element when the operating element is moved,
wherein the holding element comprises a plurality of first sections and a plurality of second sections along the sensing path which are arranged alternately successively, and
wherein the upper and lower face of the holding element are connected to each other in an electrically conductive manner in each of the first sections and are electrically insulated from each other in each of the second sections.

2. The operating device according to claim 1, wherein the operating element comprises two motion detection encoder elements arranged offset to each other along the sensing path, wherein the offset between the two motion detection encoder elements extends along a length corresponding to the extension of successive first and second sections with either an even number of first sections and an uneven number of second sections, or an uneven number of first sections and an even number of second sections, wherein, in each movement position of the operating element, one of the two motion detection encoder elements contacts a first section of the sensing path.

3. The operating device according to claim 1, wherein the operating element of the operating unit can be pushed down reversibly in the direction of the holding element and comprises at least one push detection encoder element, electrically connected to the electrically conductive surface of the operating element, which contacts a local area electrically connecting the upper face of the holding element with its lower face if the operating element is in a pushed down state.

4. The operating device according to claim 3, wherein the respective electrical area of the holding element, contacted in a pushed down state of the operating element by the at least one push detection encoder element, is one of the first sections of the holding element.

5. The operating device according to claim 4, wherein the operating element comprises two push detection encoder elements arranged offset to each other along the sensing path, wherein, in each movement position of the operating element, at least one of the two push detection encoder elements contacts a first section of the sensing path.

6. The operating device according to claim 5, wherein the offset between the two push detection encoder elements extends along a length corresponding to the extension of successive first and second sections with either an even number of first sections and an uneven number of second sections, or an uneven number of first sections and an even number of second sections.

7. The operating device according to claim 1, wherein the at least one motion detection encoder element is a deformation or an element being an integral component of a linear or circular, electrically conductive spring material strip and protruding or projecting therefrom.

8. The operating device according to claim 7, wherein the at least one push detection encoder element is a deformation or an element being an integral component of a linear or circular, electrically conductive spring material strip and protruding or projecting therefrom.

9. The operating device according to claim 1, wherein the operating element is a detent means with at least one elastically or reversibly movable detent element, and with a detent path with alternately successively arranged detent protrusions and detent recesses, wherein the at least one de-tent element is arranged on the operating element and the detent path on the holding element or vice versa.

10. The operating device according to claim 9, wherein the sensing path of the holding element is adapted as a detent path of the detent means, comprising the detent protrusions and the detent recesses, wherein the at least one detent element serves as a motion detection encoder element.

11. The operating device according to claim 10, wherein each first and second section of the holding element, arranged along the sensing path, extends from the center of a detent recess to the center of an adjacent detent recess, or from the center of a detent protrusion to the center of an adjacent detent protrusion.

12. The operating device according to claim 11, wherein the at least one detent element and the push detection encoder element are adapted in and/or on the same spring material strip.

13. The operating device according to claim 1, wherein the operating element is adapted as a slider or a rotary adjuster.

14. The operating device according to claim 13, wherein the slider or the rotary adjuster can be pushed down.

15. The operating device according to claim 1, wherein the touch panel is adapted as part of a touch screen on whose display side the operating unit is arranged.

16. The operating device according to claim 1, comprising a force-feedback function optionally in conjunction with a force sense function of the touch panel of the operating element or of a touch screen.

17. The operating device according to claim 1, wherein the holding element is partially arranged on the touch sensitive surface of the upper face of the touch panel, wherein, in each movement position of the operating unit, at least one of the motion detection encoder elements and, if available, at least one of the push detection encoder elements is positioned in the area of the upper face of the holding element below which the touch sensitive surface of the upper face of the touch panel is located.

18. The operating device according to claim 17, wherein, in each movement position of the operating element, two of the motion detection encoder elements and, if available, at least one of the push detection encoder elements are positioned in the area of the upper face of the holding element below which the touch sensitive surface of the upper face of the touch panel is located.

* * * * *